July 1, 1969 J. O. M. VAN LANGEN ET AL 3,452,430
METHOD OF MANUFACTURING A MAGNETIC HEAD WITH A SUBSTANTIALLY BUBBLE-FREE GAP
Filed May 7, 1964
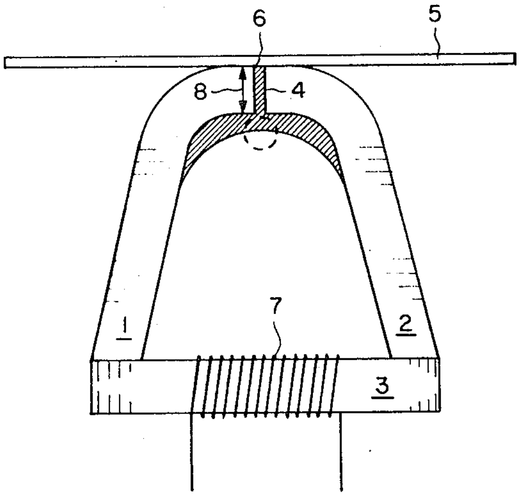
INVENTOR.
J. O.M. VAN LANGEN.
JOHANNES W. BASTIAANSSEN
BY
Frank R. Trifari
AGENT United States Patent Office 3,452,430
Patented July 1, 1969

3,452,430

METHOD OF MANUFACTURING A MAGNETIC HEAD WITH A SUBSTANTIALLY BUBBLE-FREE GAP

Johannes Otto Michael van Langen and Johannes Wilhelmus Bastiaanssen, Emmasingel, Eindhoven, Netherlands, assignors, by mesne assignments, to U.S. Philips Corporation, New York, N.Y., a corporation of Delaware Filed May 7, 1964, Ser. No. 365,830
Claims priority, application Netherlands, May 8, 1963, 292,510/63
Int. Cl. H01f 7/06
U.S. Cl. 29—603 1 Claim

ABSTRACT OF THE DISCLOSURE

A method of forming a magnetic head having a bubble-free glass gap employs the step of boiling the magnetic head at an elevated temperature prior to assembly in a concentrated solution of hydrochloric acid.

This invention relates to methods of manufacturing composite bodies, and more particularly to magnetic heads for recording or reproducing magnetic recordings of audio signals or video signals, and to bodies thus manufactured.

Magnetic heads comprise at least two core parts of sintered oxidic ferromagnetic material separated by a useful gap filled with vitreous material which is sealed to the gap-boundary surfaces and serves mechanically to join the two core parts.

Several methods are known for providing the vitreous material up to the desired width of gap between the parts of the oxidic ferromagnetic material.

In one method, each gap-boundary surface is covered with a layer of a glaze paste and, after the layers are dried, the core parts are pressed against one another while heating to a temperature such that the glaze melts. After cooling, the two layers have united to form a single layer which joins the two core parts.

In another known method a glass foil is provided between the gap-boundary surfaces, the foil having a thickness a few percent greater than the width of gap ultimately desired, whereupon the whole is heated into the softening region of the glass and then the core parts are pressed on one another at a temperature lying in the said softening region at a pressure such that, after the glass has cooled down, the correct width of gap is obtained.

In a further method at least two parts of sintered oxidic ferromagnetic material are placed with their gap-boundary surfaces on each other with the interposition of spacers having a thickness equal to the desired width of the gap, whereafter an amount of vitreous material in the form of grains, powder or a coherent rod or plate is provided against the resulting gap or gaps and then the whole is heated into the softening range of the vitreous material. During this process the vitreous material is drawn into the gap due to the capillary action thereof.

In these known constructions the choice of the vitreous material has to be matched to the oxidic ferromagnetic material in view of the coefficients of expansion.

Some examples of usable combinations are:

| Oxidic ferromagnetic material: | Mol percent |
|---|---|
| MnO | 24.1 |
| ZnO | 23.4 |
| FeO | 2.3 |
| $Fe_2O_3$ | 48.8 |
| $SiO_2$ | 1.3 |

| Glass: | Percent by weight |
|---|---|
| $SiO_2$ | 56.2 |
| $Na_2O$ | 7.6 |
| $K_2O$ | 4.5 |
| PbO | 30.0 |
| $Al_2O_3$ | 1.2 |
| $Sb_2O_3$ | 0.3 |
| MnO | 0.25 |

Coefficient of expansion between 0° C. and 40° C.: $9.3\times10^{-6}$, $9.2\times10^{-6}$.

| Oxidic ferromagnetic material: | Mol percent |
|---|---|
| NiO | 17.5 |
| ZnO | 33.2 |
| $Fe_2O_3$ | 49.0 |
| $SiO_2$ | 0.3 |

| Glass: | Percent by weight |
|---|---|
| $SiO_2$ | 72.5 |
| $Na_2O$ | 11.5 |
| CaO | 10.0 |
| MgO | 3.3 |
| $Al_2O_3$ | 2.5 |
| $K_2O$ | 0.2 |

Coefficent of expansion between 0° C. and 40° C.: $7.1\times10^{-6}$, $7.3\times10^{-6}$.

The quality of magnetic heads has been unsatisfactory hitherto because during the sealing process bubbles occurred in the vitreous material at the transition surface of the glass and the ferromagnetic material. This gives rise to a reduced life. During grinding off, small holes are formed at the surface at the areas of the bubbles in which holes grindings are accumulated which result in increased wear of the magnetic recording tape and of the head.

The single figure of the drawing shows an example of a magnetic head manufactured by any of the foregoing described methods. In the figure, reference numerals 1 and 2 designate two core parts of sintered oxidic ferromagnetic material separated by a gap 6 filled with vitreous material sealed to the boundary surfaces of the core parts. A yoke 3 is provided to close the magnetic circuit and a winding 7 coupled thereto for applying electrical signals to or deriving such signals from the head. The gap boundary surface of core part 2 is designated by reference numeral 4 and a magnetic tape 5 is shown which co-acts with the front part of the head. Reference numeral 8 denotes the height of the gap. For strengthening the structure, the vitreous material may extend into part of the space bounded by the core parts as shown.

According to a suggestion not published hitherto, a slight improvement has been obtained in that the parts of the oxidic ferromagnetic material are heated for a short period, if desired after polishing and degreasing the gap-boundary surfaces and prior to providing the vitreous material, at a temperature between 800° C. and 1000° C.

According to the invention an important improvement has been obtained in that the parts of the oxidic ferromagnetic material, if desired after polishing the gap-boundary surfaces and short-period heating at a temperature between 800° C. and 1000° C. and prior to providing the vitreous material, are treated at elevated temperature with a concentrated aqueous solution of a non-oxidizing strong acid.

In one example, oxidic ferromagnetic parts of a magnetic head are polished at their gap-boundary surfaces with the aid of one of the above-mentioned compositions and then heated in air at 900° C. for 30 minutes.

Next the parts are boiled in concentrated hydrochloric acid ($d$=1.19) for 10 to 30 minutes. After rinsing in water and drying, the parts are joined together with the aid of vitreous material of the above-mentioned matched composition to form the glass gap by one of the specified methods.

A seal is thus obtained which is free from gas bubbles.

We claim:

1. The method of manufacturing a composite magnetic head of two head parts of sintered oxidic ferromagnetic material each having polished gap boundary surfaces separated by a substantially bubble free non-magnetic gap bonding material comprising the steps of heating the parts to a temperature of between 800° C. and 1000° C., boiling the parts in a solution of concentrated hydrochloric acid for between 10 and 30 minutes, rinsing said parts, and providing vitreous material between the polished gap boundary surfaces of the parts to bond said parts together.

References Cited

UNITED STATES PATENTS

| | | | |
|---|---|---|---|
| 2,070,272 | 2/1937 | Harder et al. | 117—53 |
| 2,532,640 | 12/1950 | Pfeiffer | 117—53 |
| 2,719,796 | 10/1955 | Kappes et al. | 117—53 |
| 2,862,842 | 12/1958 | Bernick et al. | |
| 2,422,628 | 6/1947 | McCarthy | 29—472.9 X |
| 2,759,252 | 8/1956 | Van Embden | 29—472.9 |
| 3,024,318 | 3/1962 | Duinker et al. | 179—100.2 |
| 3,029,559 | 4/1962 | Treptow | 29—472.9 X |
| 3,246,383 | 4/1966 | Peloschek et al. | 29—155.5 |

FOREIGN PATENTS

| | | |
|---|---|---|
| 236,226 | 6/1960 | Australia. |

JOHN F. CAMPBELL, *Primary Examiner.*

C. E. HALL, *Assistant Examiner.*

U.S. Cl. X.R.

117—53